United States Patent
Joardar et al.

(10) Patent No.: US 11,656,033 B2
(45) Date of Patent: May 23, 2023

(54) COMBINED CORE MICROCHANNEL HEAT EXCHANGER

(71) Applicant: Carrier Corporation, Palm Beach Gardens, FL (US)

(72) Inventors: Arindom Joardar, Jamesville, NY (US); James M. Wasner, Charlotte, NC (US)

(73) Assignee: Carrier Corporation, Palm Beach Gardens, FL (US)

( * ) Notice: Subject to any disclaimer, the term of this patent is extended or adjusted under 35 U.S.C. 154(b) by 136 days.

(21) Appl. No.: 17/248,006

(22) Filed: Jan. 5, 2021

(65) Prior Publication Data
US 2021/0215431 A1    Jul. 15, 2021

Related U.S. Application Data

(60) Provisional application No. 62/958,903, filed on Jan. 9, 2020.

(51) Int. Cl.
*F28F 9/02*        (2006.01)
*F28D 7/16*        (2006.01)
*F28F 1/12*        (2006.01)

(52) U.S. Cl.
CPC ........... *F28D 7/163* (2013.01); *F28F 1/12* (2013.01); *F28F 9/02* (2013.01)

(58) Field of Classification Search
CPC ........... F28D 7/163; F28F 1/12; F28F 9/02
USPC ........................................... 165/175
See application file for complete search history.

(56) References Cited

U.S. PATENT DOCUMENTS

| | | | | |
|---|---|---|---|---|
| 2007/0279861 | A1* | 12/2007 | Doll | G06F 1/20 361/679.48 |
| 2014/0202673 | A1* | 7/2014 | Wand | F28D 1/05383 165/175 |
| 2018/0100701 | A1* | 4/2018 | Beaver | F28D 3/02 |
| 2019/0368817 | A1 | 12/2019 | Huang et al. | |

FOREIGN PATENT DOCUMENTS

| | | |
|---|---|---|
| CN | 103644685 A | 3/2014 |
| EP | 3435000 A1 | 1/2019 |
| JP | H05272882 A | 10/1993 |

OTHER PUBLICATIONS

EP Application No. 21150545.8, Extended Search Report, dated May 27, 2021, 7 pages.

* cited by examiner

*Primary Examiner* — Davis D Hwu
(74) *Attorney, Agent, or Firm* — Souad Hakim

(57) ABSTRACT

Disclosed is a combined core microchannel heat exchanger comprising a first plurality of microchannel tubes extended between, and in fluid communication with, a first inlet header and a first outlet header arranged in a first fluid circuit, a second plurality of microchannel tubes extended between, and in fluid communication with, a second inlet header and a second outlet header arranged in a second fluid circuit, wherein the first fluid circuit is fluidly isolated from the second fluid circuit and a microchannel tube of the second plurality of microchannel tubes is interleaved adjacent to microchannel tubes of the first plurality of microchannel tubes, and a plurality of fins disposed between the microchannel tube of the second plurality of microchannel tubes and the first plurality of microchannel tubes.

20 Claims, 8 Drawing Sheets

COMBINED CORE MICROCHANNEL HEAT EXCHANGER

CROSS REFERENCE TO A RELATED APPLICATION

The application claims the benefit of U.S. Provisional Application No. 62/958,903 filed Jan. 9, 2020, the contents of which are hereby incorporated in their entirety

BACKGROUND

Exemplary embodiments pertain to the art of heat transfer systems. More particularly, the present disclosure relates to configurations of microchannel heat exchangers and systems thereof.

In recent years there is increasing regulatory pressure on air conditioning system manufactures to reduce the energy consumption and increase the efficiency of the products that they offer for sale. An area of opportunity for reducing energy consumption in air conditioning systems is through the use of free cooling technologies. These technologies can help reduce overall system power consumption by utilizing low outdoor temperature to help cool a working fluid directly without the use of a compressor. For example, during periods of high ambient temperature an air conditioning system can rely on a compressor to circulate a refrigerant through a cooling circuit, but when outdoor temperatures are sufficiently low the same cooling load may be achieved by using the cold ambient air to directly cool the circulating low pressure brine mixture through the cooling circuit. Because pumping the brine mixture can take less power than compressing a refrigerant a power reduction can be achieved while still meeting the cooling load. Accordingly, there remains a need in the art for systems that can adapt to changing environmental conditions to provide energy efficient cooling at low cost and with small physical footprints.

BRIEF DESCRIPTION

Disclosed is a combined core microchannel heat exchanger comprising: a first plurality of microchannel tubes extended between, and in fluid communication with, a first inlet header and a first outlet header arranged in a first fluid circuit, a second plurality of microchannel tubes extended between, and in fluid communication with, a second inlet header and a second outlet header arranged in a second fluid circuit, wherein the first fluid circuit is fluidly isolated from the second fluid circuit and a microchannel tube of the second plurality of microchannel tubes is interleaved adjacent to microchannel tubes of the first plurality of microchannel tubes, and a plurality of fins disposed between the microchannel tube of the second plurality of microchannel tubes and the first plurality of microchannel tubes.

In addition to one or more of the above disclosed aspects or as an alternate wherein the first fluid circuit comprises a vapor compression cycle and the second fluid circuit comprises a free cooling circuit.

In addition to one or more of the above disclosed aspects or as an alternate wherein the first fluid circuit comprises a first heat transfer fluid comprising a refrigerant.

In addition to one or more of the above disclosed aspects or as an alternate wherein the second fluid circuit comprises a second heat transfer fluid comprising water, glycol, a corrosion inhibitor, a brine or a combination comprising at least one of the foregoing.

In addition to one or more of the above disclosed aspects or as an alternate wherein the first plurality of microchannel tubes and the second plurality of microchannel tubes each comprise a bend for aligning a portion of the tubes.

In addition to one or more of the above disclosed aspects or as an alternate wherein the second plurality of microchannel tubes comprises two bends for aligning a portion of the second plurality of heat transfer tubes with the first plurality of heat transfer tubes.

In addition to one or more of the above disclosed aspects or as an alternate wherein the first plurality of microchannel tubes comprises multiport tubes having two or more ports and the second plurality of microchannel tubes comprises one to five ports.

In addition to one or more of the above disclosed aspects or as an alternate wherein the first plurality of microchannel tubes and the second plurality of microchannel tubes extend in an aligned, overlapping fashion for at least 60% of their effective tube length.

In addition to one or more of the above disclosed aspects or as an alternate wherein each microchannel tube of the second plurality of microchannel tubes is interleaved into the first plurality of microchannel tubes such that the combined core microchannel heat exchanger has a thickness along a third fluid circuit flow direction equal to the thickness of a single tube.

In addition to one or more of the above disclosed aspects or as an alternate wherein the first plurality of microchannel tubes comprises a ribbon bend forming a first pass section of the first plurality of microchannel tubes and a last pass section of the first plurality of microchannel tube.

In addition to one or more of the above disclosed aspects or as an alternate further comprising a third plurality of microchannel tubes extended between, and in fluid communication with, a third inlet header and a third outlet header arranged in a third fluid circuit, wherein the first fluid circuit and second fluid circuit are fluidly isolated from the third fluid circuit and a microchannel tube of the third plurality of microchannel tubes is interleaved between adjacent microchannel tubes of the first plurality of microchannel tubes in the last pass section of the first plurality of microchannel tubes.

In addition to one or more of the above disclosed aspects or as an alternate further comprising a third plurality of microchannel tubes extended between, and in fluid communication with, a third inlet header and a third outlet header arranged in the second fluid circuit, wherein a microchannel tube of the third plurality of microchannel tubes is interleaved between adjacent microchannel tubes of the first plurality of microchannel tubes in the last pass section of the first plurality of microchannel tubes.

In addition to one or more of the above disclosed aspects or as an alternate wherein the second plurality of microchannel tubes and the third plurality of microchannel tubes are arranged in a parallel flow configuration such that a flow of the second heat transfer fluid is split to flow through both the second plurality of microchannel tubes and the third plurality of microchannel tubes simultaneously before the flow merges.

In addition to one or more of the above disclosed aspects or as an alternate wherein the third fluid circuit comprises a free cooling cycle.

In addition to one or more of the above disclosed aspects or as an alternate wherein the third fluid circuit comprises a third heat transfer fluid comprising water, glycol, a corrosion inhibitor, a brine or a combination comprising at least one of the foregoing.

Further disclosed is an air conditioning system comprising a heat sink, a heat source, a first fluid circuit comprising an evaporator and a condenser of a vapor compression cycle, a second fluid circuit for transferring thermal energy from the heat source to the evaporator, a free cooling circuit for transferring thermal energy from the heat source to the condenser, wherein the condenser comprises a first plurality of microchannel tubes extended between, and in fluid communication with, a first inlet header and a first outlet header arranged in the first fluid circuit, a second plurality of microchannel tubes extended between, and in fluid communication with, a second inlet header and a second outlet header arranged in the free cooling circuit, wherein the first fluid circuit is fluidly isolated from the free cooling circuit and a microchannel tube of the second plurality of microchannel tubes is interleaved between adjacent microchannel tubes of the first plurality of microchannel tubes, and a plurality of fins disposed between the microchannel tube of the second plurality of microchannel tubes and the first plurality of microchannel tubes.

In addition to one or more of the above disclosed aspects or as an alternate wherein the heat source is a data center and the heat sink is the outdoor environment.

Further disclosed is a combined core microchannel heat exchanger comprising: a first plurality of microchannel tubes extended between, and in fluid communication with, a first inlet header and a first outlet header arranged in a vapor compression circuit, a second plurality of microchannel tubes extended between, and in fluid communication with, a second inlet header and a second outlet header arranged in a free cooling circuit, wherein the vapor compression circuit is fluidly isolated from the free cooling circuit and the second plurality of microchannel tubes are interleaved adjacent to microchannel tubes of the first plurality of microchannel tubes, and a plurality of fins disposed between the second plurality of microchannel tubes and the first plurality of microchannel tubes at least along a portion of an effective length of the first plurality of microchannel tubes.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
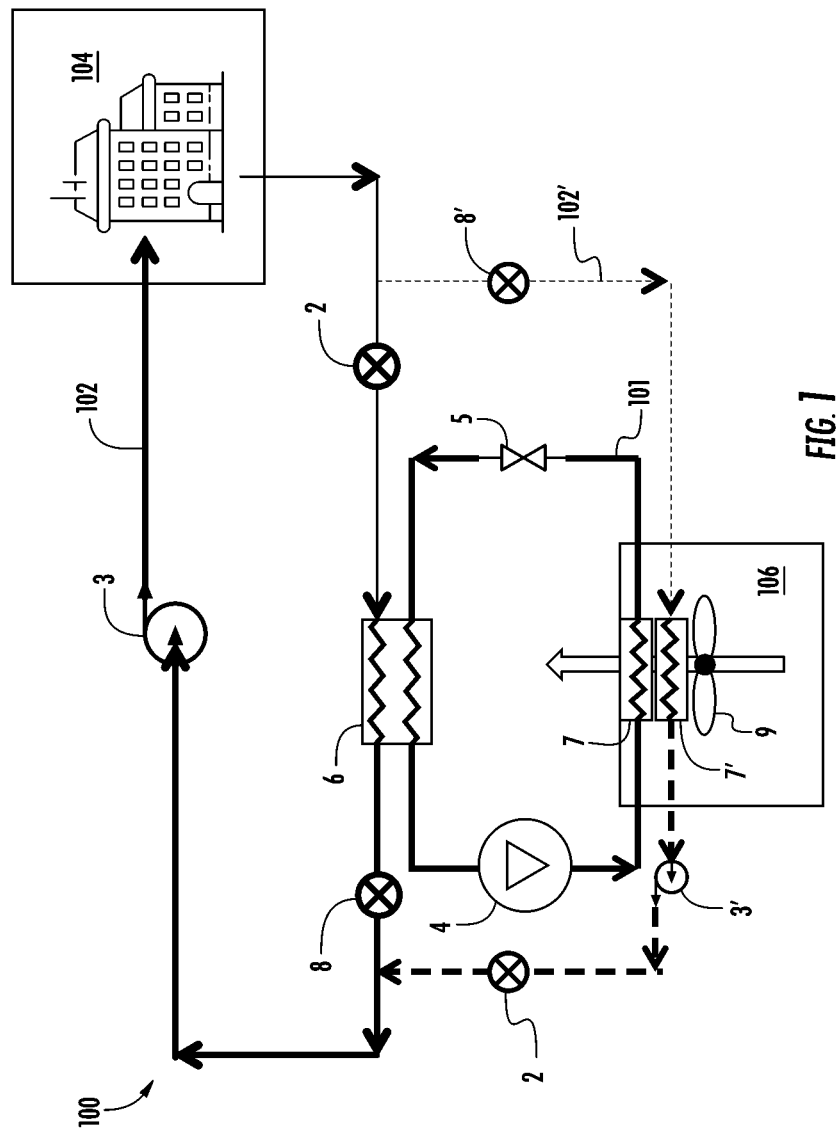
FIG. 1 is a schematic illustration of and air conditioning system having a free cooling option.

FIG. 1 is a schematic illustration of an air conditioning system 100 having a free cooling option. A first fluid circuit 101 can include a vapor compression cycle, including a first compressor 4 for compressing and circulating a first heat transfer fluid (e.g., refrigerant) around the circuit. The first heat transfer fluid exiting the compressor 4 can be cooled in a first condenser 7 (e.g., by a condenser fan or blower 9 forcing fluid flow across the first condenser 7) at a heat sink location 106 (e.g., outdoor environment). The cooled and pressurized first heat transfer fluid can then be expanded through an expansion valve 5 before entering a cold side of an evaporator 6. There the first heat transfer fluid can absorb thermal energy from a second heat transfer fluid conveyed in a second fluid circuit 102 passing through the hot side of evaporator 6. The first heat transfer fluid can complete the first fluid circuit 101 at the first compressor 4 (e.g., as a vapor phase refrigerant).

The second fluid circuit 102 includes a pump 3 for circulating the second heat transfer fluid around the circuit. As the second heat transfer fluid passes through a zone to be cooled 104 it can absorb thermal energy from the zone (e.g., by one or more terminal fan-coil units such as those having a cooling-coil fan or blower forcing fluid flow across the terminal coil). This thermal energy can be transferred to the first fluid circuit 101 through evaporator 6 as the second fluid circuit 102 passes through the hot side of evaporator 6. The evaporator can be any suitable evaporator such as a liquid/liquid evaporator, for example a shell-and-tube or brazed plate type heat exchanger can serve as evaporator 6 in exchanging thermal energy between the first fluid circuit 101 and the second fluid circuit 102. The cooled second heat transfer fluid exiting the hot side of evaporator 6 can complete the second fluid circuit 102 at the pump 3.

The second fluid circuit 102 can include a free cooling circuit 102', which can include a second pump 3' for optionally circulating at least a portion of the second heat transfer fluid through the free cooling circuit 102'. When the ambient temperature is below a certain temperature threshold, the free cooling cycle 102' can be utilized wherein the second heat transfer fluid can be directly cooled in a second condenser 7' at a heat sink location 106 (e.g., outdoor environment). The second heat transfer fluid can be partly or fully diverted to the second condenser 7' by way of actuation of appropriate valves 2, 2', 8, 8' (e.g., isolation valves) depending on the operational load and ambient temperature. There thermal energy absorbed by the second heat transfer fluid, from the zone to be cooled 104, can be released directly at the heat sink location 106 (e.g., by a condenser fan or blower 9 forcing fluid flow across the second condenser 7'). If a second pump 3' is not included, flow of the second heat transfer fluid around the second fluid circuit 102 and through the free cooling circuit 102' can be induced by a temperature difference between the heat sink (e.g., condenser 106) and the heat source (e.g., terminal fan-coil at the zone to be cooled 104). This can be achieved by operating the terminal cooling coil fan or blower and the condenser fan or blower 9 to maintain the temperature difference.

The first heat transfer fluid can include any suitable refrigerant, for example refrigerants such as R32, R410A, R134a, and the like, or a low GWP refrigerant such as R454B, R32, R452a, R1234ze, R1234yf, R1233zd(e) or a combination including one or more of the foregoing, and the like. The second heat transfer fluid can include a brine, fresh water, a water mixture, propylene glycol, glycol, corrosion inhibitors, or a combination including one or more of the foregoing, and the like. For example, the second heat transfer fluid can include products manufactured by Dow Chemical Company, Michigan, US having names such as Dowfrost (96 wt % propylene Glycol, 4 wt % performance additives), or Dowtherm (eutectic mixture of biphenyl—$C_{12}H_{10}$ diphenyl oxide—$Cl_2H_{10}O$) or products manufactured by Climalife Paris, France having names such as Friogel (concentrated mono-propylene glycol and corrosion inhibitors), or Neutragel (mono-ethylene glycol and corrosion inhibitors). The first fluid circuit 101 can include a two phase fluid (e.g., including a liquid and vapor phase) and the second fluid circuit 102, the free cooling circuit 102', and a third fluid circuit 103 can include a liquid phase fluid.

FIG. 1 shows the fluid circuits (101, 102, 102') schematically with the first fluid circuit 101 inboard of the free cooling circuit 102'. However, other orientations of the two fluidly separate circuits are contemplated by the inventor. For example, the first fluid circuit 101 can be outboard of the free cooling circuit 102', the first fluid circuit 101 can be inboard of the free cooling circuit 102' along one or more sections of the circuit, the free cooling circuit 102' can be inboard of the first fluid circuit 101 along one or more sections of the circuit, or the like.

Figure 2:
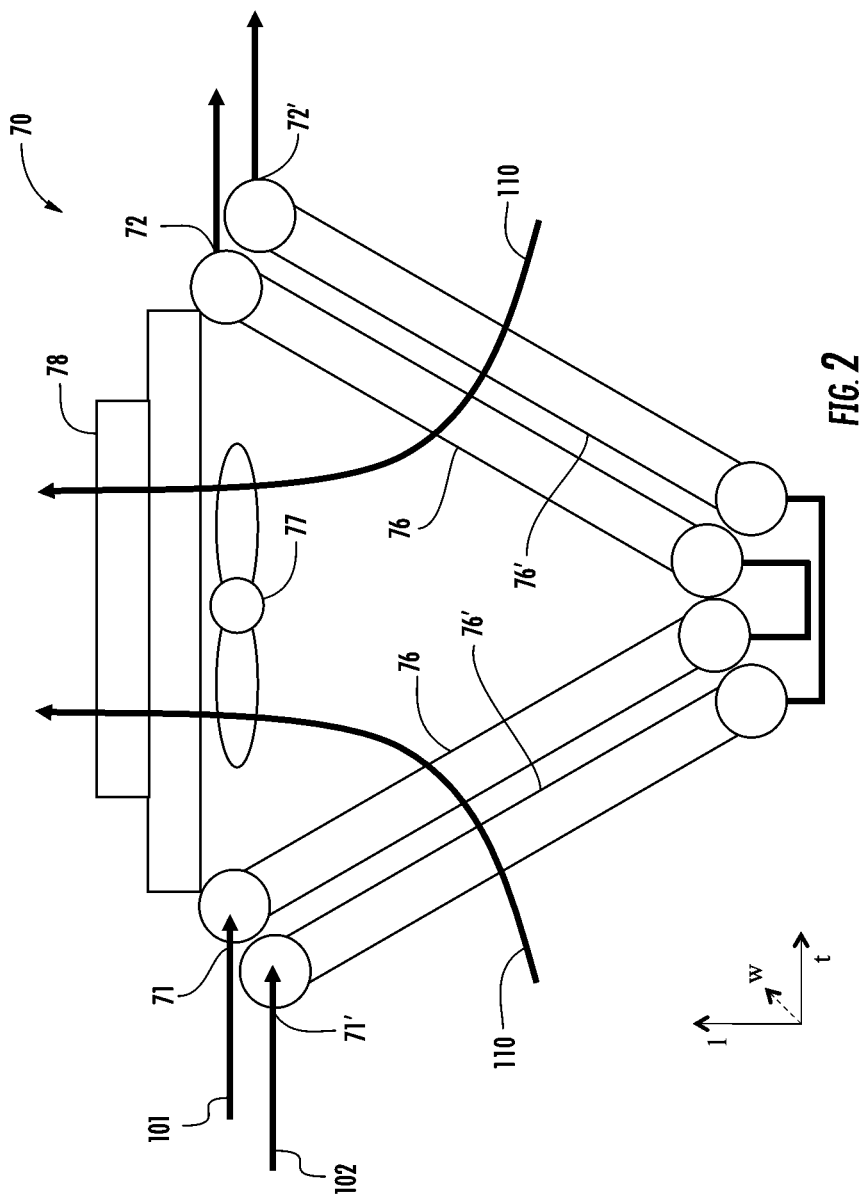
FIG. 2 is a schematic illustration of a condenser unit.

FIG. 2 is a schematic illustration of a side view of a condenser unit 70 which can be used in the air conditioning system 100 having two separate fluid circuits. The first fluid circuit 101 can be part of a vapor compression cycle and can include conduits for directing the first heat transfer fluid from the evaporator 6 to a first condenser inlet 71, through two separate first condenser coils 76 and out of the condenser unit 70 via a first condenser outlet 72. The first condenser coils 76 are arranged in a V shape, but other arrangements are contemplated, including an A shape (e.g., upside down V shape), C shape, J shape, L shape, M shape, N shape, U shape, W shape, or Z shape and the like.

The second fluid circuit 102 can be part of a free cooling circuit 102' (e.g., forming a contiguous circuit) and can include conduits for directing the second heat transfer fluid from the heat source at the zone to be cooled 104 (e.g., terminal fan-coil at 104) to a second condenser inlet 71', through two separate second condenser coils 76' and out of the condenser unit 70 via a second condenser outlet 72'. The second condenser coils 76' are arranged in a V shape, but other arrangements are contemplated, including an A shape (e.g., upside down V shape), C shape, J shape, L shape, M shape, N shape, U shape, W shape, or Z shape and the like.

A fan 77 can be arranged within the V shaped condenser coils and can draw a third heat transfer fluid (e.g., air) along a flow path 110 through the condenser coils (76', 76) and out the top flow guide 78. This arrangement is presented for illustrative purposes only. Other arrangements are contemplated by the inventor. For example, at least any of the inlet and/or outlet locations, heat exchanger shapes and orientations, internal heat exchanger circuiting of any of the heat exchanger coils (76, 76'), the order of heat exchanger coils along the flow path 110 direction, the flow direction of the first heat transfer fluid, the flow direction of the second heat transfer fluid, the direction of the flow path 110 of the third heat transfer fluid, the order of heat exchanger coils along the first fluid circuit 101, the location of the second pump 3' in the free cooling circuit, the order of heat exchanger coils along the second fluid circuit 102, or the order of heat exchanger coils along the free cooling circuit 102', and the like can be altered without departing from the breadth of the present disclosure.

The inventor recognized that a limitation of the air conditioning system 100 can be the serial arrangement of the first condenser 7 and the second condenser 7' at the heat sink location 106. In a serial arrangement, as shown in FIG. 2, the third heat transfer fluid is urged along flow path 110, past the second condenser 7' and the first condenser 7 in a serial fashion. An arrangement where the third heat transfer fluid flows along flow path 110 in the opposite direction, first across the first condenser 7 then across the second condenser 7' is also contemplated. However, either serial arrangement requires the third heat transfer fluid to flow across both the first condenser 7 and the second condenser 7' during any operating mode that either condenser is operating. This can include an air conditioning only mode where only the first fluid circuit 101 can be operating, a free cooling only mode where only the free cooling circuit 102' can be operating, or a combined mode where both the first fluid circuit 101 and the free cooling circuit 102' can be operating simultaneously. As a result, due to the presence of two coils, the flow resistance through the cold side (e.g., air side) of the condenser unit 70 can be higher than is needed, at least during operating modes when only a single coolant loop is operating. Accordingly, the power consumption of the fan 77, which can correlate with flow resistance imparted on the fan 77 and impeding flow (e.g., by pressure drop elements upstream or downstream of the fan), can exceed a minimum amount needed for the condenser operation during at least these modes. A higher fan power can result in lower system efficiency. Also, larger capacity fans and motors are needed to manage the extra pressure drop duty associated with higher pressure drop condenser coil which can increase product cost.

Figure 3:
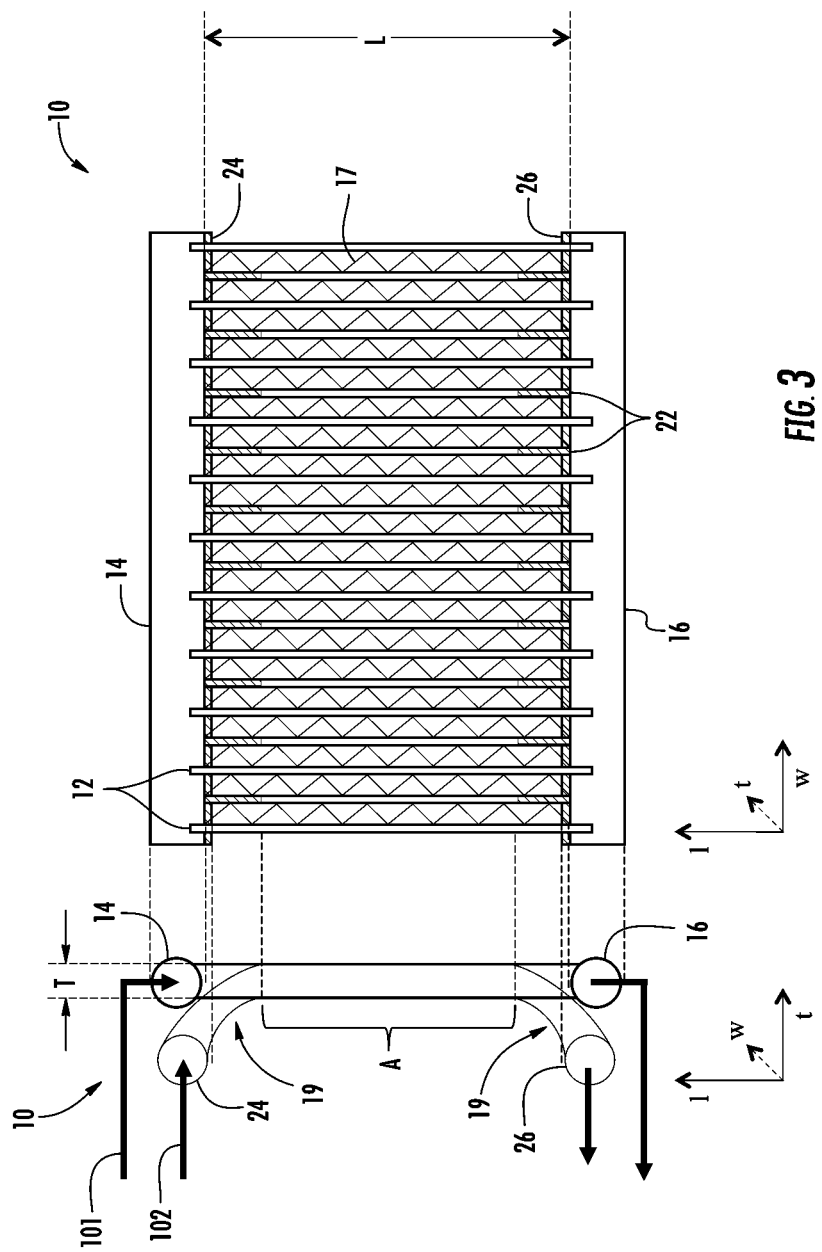
FIG. 3 is a schematic illustration of a side and front view of a combined core microchannel heat exchanger.
Figure 4:
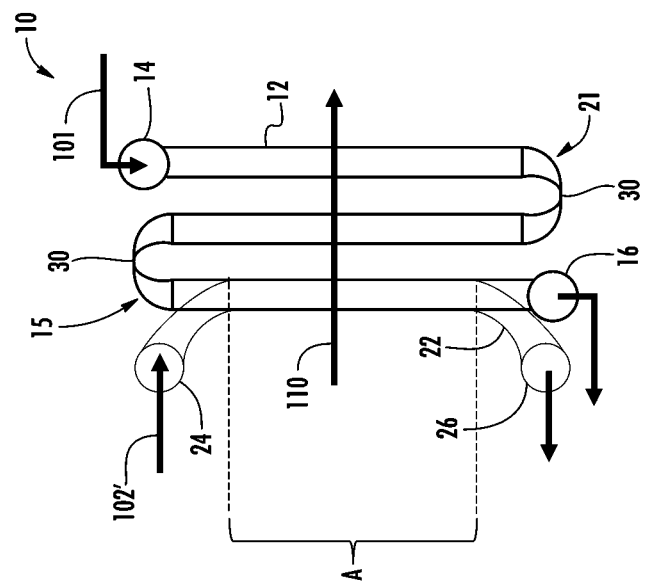
FIG. 4 is a schematic illustration of a side view of a combined core microchannel heat exchanger having a ribbon bend.
Figure 5:
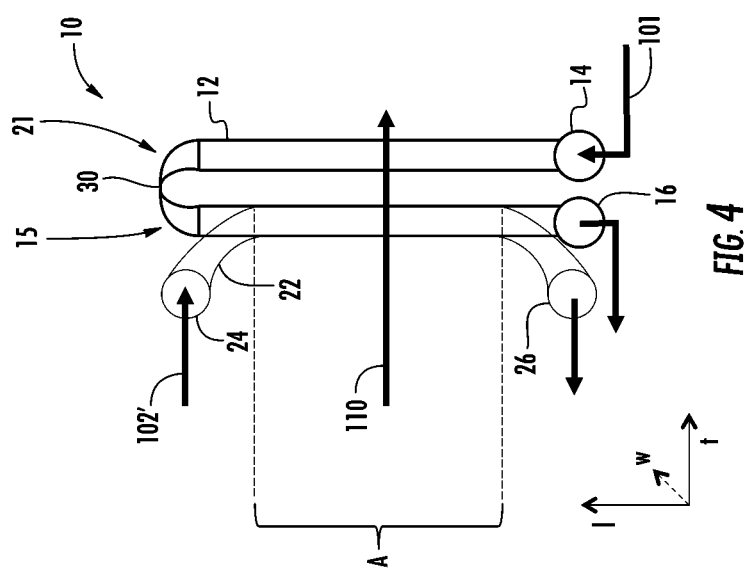
FIG. 5 is a schematic illustration of a side view of a combined core microchannel heat exchanger having two ribbon bends.

To overcome at least this limitation a combined core microchannel heat exchanger 10 is disclosed. FIG. 3 is a schematic illustration of a side view and a corresponding front view of the combined core microchannel heat exchanger 10. The combined core microchannel heat exchanger 10 includes a pair of first headers (14, 16) having a first plurality of microchannel tubes 12 extending therebetween, and a pair of second headers (24, 26) having a second plurality of microchannel tubes 22 extending therebetween. The first plurality of microchannel tubes 12 are disposed in fluid communication with the first headers (14, 16) and can be fluidly connected to the first fluid circuit 101. The second plurality of microchannel tubes 22 are disposed in fluid communication with the second headers (24, 26) and can be fluidly connected to the free cooling circuit 102'. The first fluid circuit 101 can be fluidly isolated from the second fluid circuit 102 and from the free cooling circuit 102'. The second fluid circuit 102 and the free cooling circuit 102' can be fluidly joined as a contiguous circuit (e.g., in fluid communication with one another). Individual microchannel tubes of the second plurality of microchannel tubes 22 can be interleaved adjacent to tubes of the first plurality of microchannel tubes 12 to form the combined core microchannel heat exchanger.

For example, one or both of the first plurality of microchannel tubes 12 and second plurality of microchannel tubes 22 can include a bend 19 (e.g., two bends in the 1-axis dimension) such that a portion A of the first plurality of microchannel tubes 12 can be aligned with the second plurality of microchannel tubes 22 (e.g., such that the first plurality of microchannel tubes 12 and the second plurality of microchannel tubes 22 can be superimposed over one another along a portion A of their length in the l-t plane of the attached figures). In this way the combined core microchannel heat exchanger 10 can be formed having a thickness T (e.g., extending in the t-axis dimension of the attached figures) corresponding to a single row of tubes along a portion A of a length (e.g., as measured along the l-axis dimension in the attached figures) and along a section W of the width (e.g., as measured along the w-axis dimension in the attached figures) of the heat exchanger. For example, a tube from the second plurality of microchannel tubes 22 can extend interleaved with a tube of the first plurality of microchannel tubes 12 for a distance of from about 50% to about 95% of the effective length L of the first plurality of microchannel tubes 12, or more specifically about 60% to about 90%, or about 65% to about 80% of the effective length of the first plurality of microchannel tubes 12. Where the effective length L of a tube of the first plurality of microchannel tubes 12 can be the average path distance the tube travels between the pair of first headers (14, 16) such as shown in FIG. 3, e.g., accounting for curvature along the path, but not including any insertion distance into the header.

One or more microchannel tubes from the first fluid circuit 101 can be interleaved with microchannel tubes of the free cooling circuit 102' in any suitable ratio with any suitable distribution. In an embodiment, all the tubes of the second plurality of microchannel tubes 22 are interleaved adjacent to tubes of the first plurality of microchannel tubes 12. The ratio and configuration of interleaved tubes can be selected for a specific application based on the application conditions. For example, the ratio of first tubes (e.g., tubes from the first plurality of microchannel tubes 12) to second tubes (e.g., tubes from the second plurality of microchannel tubes 22) in the combined core microchannel heat exchanger 10 can include any ratio, e.g., 1:1, 1:2, 1:3, 1:4, 1:5, 1:6, 1:7, 1:8, 2:1, 3:1, 4:1, 5:1, 6:1, 7:1, 8:1, 2:2, 3:3, 2:3, 3:2, 4:4, 5:5, 6:6, and the like. Further, the distribution of interleaved second tubes throughout the width (e.g., extending in the w-axis dimension in the attached figures) of the combined core microchannel heat exchanger 10 can include any suitable distribution, e.g., uniform distribution, a normal distribution (e.g., having a higher ratio of second tubes to first tubes in one region along the width of the combined core microchannel heat exchanger 10), a multi-modal distribution (e.g., having a higher ratio of second tubes to first tubes in more than one region along the width of the combined core microchannel heat exchanger 10), and the like.

The microchannel tube construction of the first plurality of microchannel tubes 12 and the second plurality of microchannel tubes 22 can be different, e.g., to account for physical property differences of the fluids they can convey. Microchannel tubes conveying refrigerant can have from 2 to about 50 ports, each port having an internal port hydraulic diameter of about 0.1 millimeters (mm) to about 25 mm, or from about 1 mm to about 16 mm, or from about 4 mm to about 14 mm. For example, the first plurality of microchannel tubes 12 conveying the first heat transfer fluid (e.g., a refrigerant) can include multi-port tubes having 25 ports having a diameter of between 1 mm and 2 mm. Microchannel tubes conveying refrigerant can include internal surface features (e.g., ridges, grooves, and the like) or other heat transfer enhancements (e.g., flow altering inserts) to improve heat transfer performance of the combined core microchannel heat exchanger 10. Microchannel tubes conveying the second heat transfer fluid (e.g., brine, water, and the like) can have fewer, larger ports than microchannel tubes conveying refrigerant, for example, a microchannel tube conveying the second heat transfer fluid can include 1-6 ports, or 1-2 ports, or a single port. The port size for ports conveying the second heat transfer fluid can be from about 5 mm to about 36 mm, or from about 16 mm to about 36 mm, or from about 20 mm to about 30 mm.

Heat transfer fins 17 can be disposed between microchannel tubes of the first plurality of microchannel tubes 12 and the interleaved second plurality of microchannel tubes 22 to enhance the overall heat transfer capability of the combined core microchannel heat exchanger 10. Heat transfer fins 17 can be configured to extend between the first header 14 and the second header 16, past the portion A where the first tube and second tube align as described previously. Such heat transfer fins 17 can include any suitable fin type, including for example, lanced, louvered, slotted, offset, wavy, or a combination comprising at least one of the foregoing. Heat transfer fins 17 can be arranged between adjacent tubes of the interleaved tubes prior to a brazing operation. A brazing or other fixing operation can be used to fixedly attach heat transfer fins 17 to the combined core microchannel heat exchanger 10.

By interleaving one or more tubes from separate fluid circuits, the separate circuits can benefit from a single heat transfer location where they can each exchange heat with a third fluid which can improve compactness of the heat transfer system. This can allow for the third fluid to pass through a single core thickness which can have a reduced pressure drop in comparison to separate cores for each fluid. Interleaving can allow for parallel heat transfer operations versus layering rows of tubes in a serial fashion with respect to the flow of the third fluid. Thus the combined core microchannel heat exchanger 10 allows for lower overall system cost for free cooling applications.

The headers (14, 16, 24, 26) can be any suitable size and shape. For example, the headers (14, 16, 24, 26) can have a cross-sectional shape including circular, oval, triangular, quadrilateral, D-shaped, half-circle, and the like. Furthermore, one or both first headers (14, 16) can have the same cross-sectional shape of at least one of the second headers (24, 26). For example, the first inlet header 14, first outlet header 16, second inlet header 24, and/or second outlet header 26 can have a circular cross-section having an inside diameter from about 12 millimeters (mm) to about 60 mm, or from about 20 mm to about 36 mm, or from about 26 mm to about 28 mm, or about 27 mm. Similarly, the first inlet header 14, first outlet header 16, second inlet header 24, and/or second outlet header 26 can have a D-shaped cross-section having cross-sectional dimension (e.g., hydraulic diameter) from about 12 mm to about 60 mm, or from about 20 mm to about 36 mm, or from about 26 mm to about 28 mm, or about 27 mm.

The second headers (24, 26) of the combined core microchannel heat exchanger 10 can be disposed in any suitable arrangement relative to the first headers (14, 16). For example, the second headers (24, 26) can be disposed upstream of the first headers (14, 16) along the flow path 110 of the third heat transfer fluid, one of the second headers (24, 26) can be disposed upstream of the first headers (14, 16) along the flow path 110 of the third heat transfer fluid and the other second header (24, 26) can be disposed downstream of the first headers (14, 16) along the flow path 110 of the third heat transfer fluid, the second headers (24, 26) can be disposed adjacent the first headers (14, 16) at the same location along the flow path 110 of the third heat transfer fluid, and the like.

Figure 6:
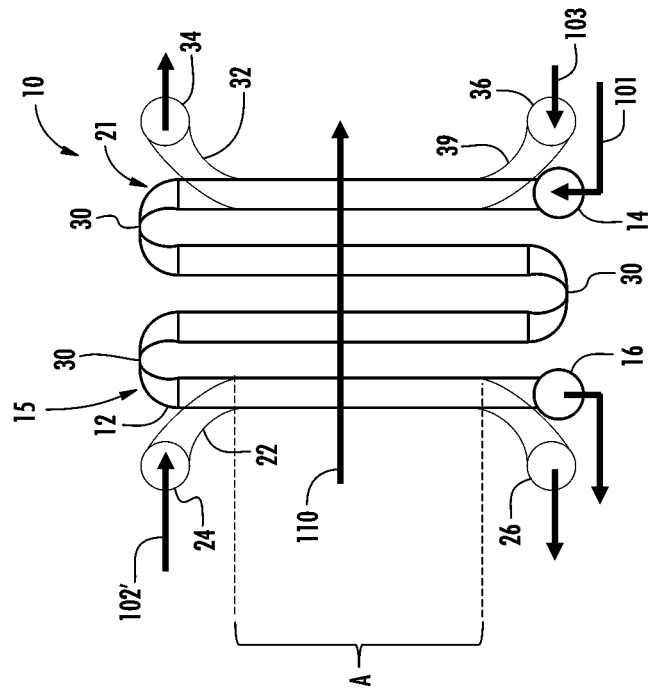
FIG. 6 is a schematic illustration of a side view of a combined core microchannel heat exchanger having a ribbon bend and a second interleaved core.
Figure 7:
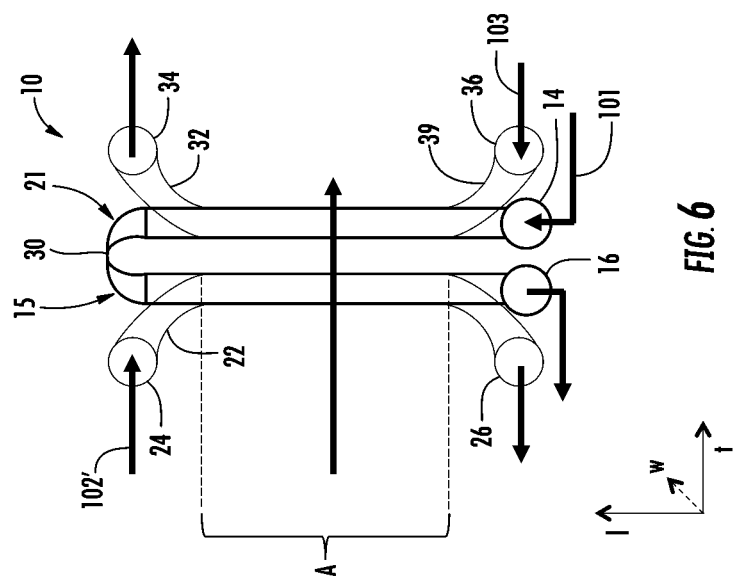
FIG. 7 is a schematic illustration of a side view of a combined core microchannel heat exchanger having multiple ribbon bends and a second interleaved core.

Turning now to FIGS. 4-7, one or both of the first plurality of microchannel tubes 12 and the second plurality of microchannel tubes 22 of the combined core microchannel heat exchanger 10 can include one or more ribbon bends or folded sections 30. A folded coil can allow for additional passes of the first heat transfer fluid through the flow path 110 of the third heat transfer fluid as shown in FIGS. 4-7. For example, a ribbon bend or folded section 30 can establish a first pass section 15 of the first plurality of microchannel tubes 12 and a last pass section 21 of the first plurality of microchannel tubes 12 (e.g., where pass number is relative to passes across the flow path 110 of the third heat transfer fluid). Furthermore, as shown in FIGS. 6-7, a combined core microchannel heat exchanger 10 can include one or more folded sections 30 and a second interleaved core 39 having a third plurality of microchannel tubes 32 extending between, and in fluid communication with, a pair of third headers (34, 36). The third plurality of microchannel tubes 32 can be interleaved with tubes in the last pass section 21 of the first plurality of microchannel tubes 12. The third plurality of microchannel tubes 32 can be part of the free cooling circuit 102'. For example, the third outlet header 36 can be fluidly connected to the second inlet header 24, the second outlet header 26 can be fluidly connected to the third inlet header 34, or other circuiting arrangements can be configured. Alternatively, the second interleaved core 39 can be part of a separate fluid circuit, a third fluid circuit 103 (e.g., as shown in FIGS. 6-7) conveying a third heat transfer fluid. The third heat transfer fluid can include any of the heat transfer fluids indicated previously for the first or second heat transfer fluids (e.g., including a brine, a water mixture, a refrigerant, and the like). Such configurations can allow system designers additional flexibility in designing an air conditioning system utilizing free cooling.

For example, the efficiency of free cooling during a given outdoor temperature can be a function of the type of heat transfer fluid that is used to convey the thermal energy. A combined core microchannel heat exchanger 10 having a third fluid circuit 103 can allow for the selection of up to three different fluids, e.g., a refrigerant and two different brines or water mixtures, a brine or water mixture and two different refrigerants, three brines or water mixtures, three refrigerants, and the like. The additional heat transfer fluid offered in this configuration can provide another operating point where the operation can be optimized, for energy efficiency for example. Other operating points where the operation can be optimized can correspond to air conditioning only, free cooling only, or combined operating modes previously described.

Figure 8:
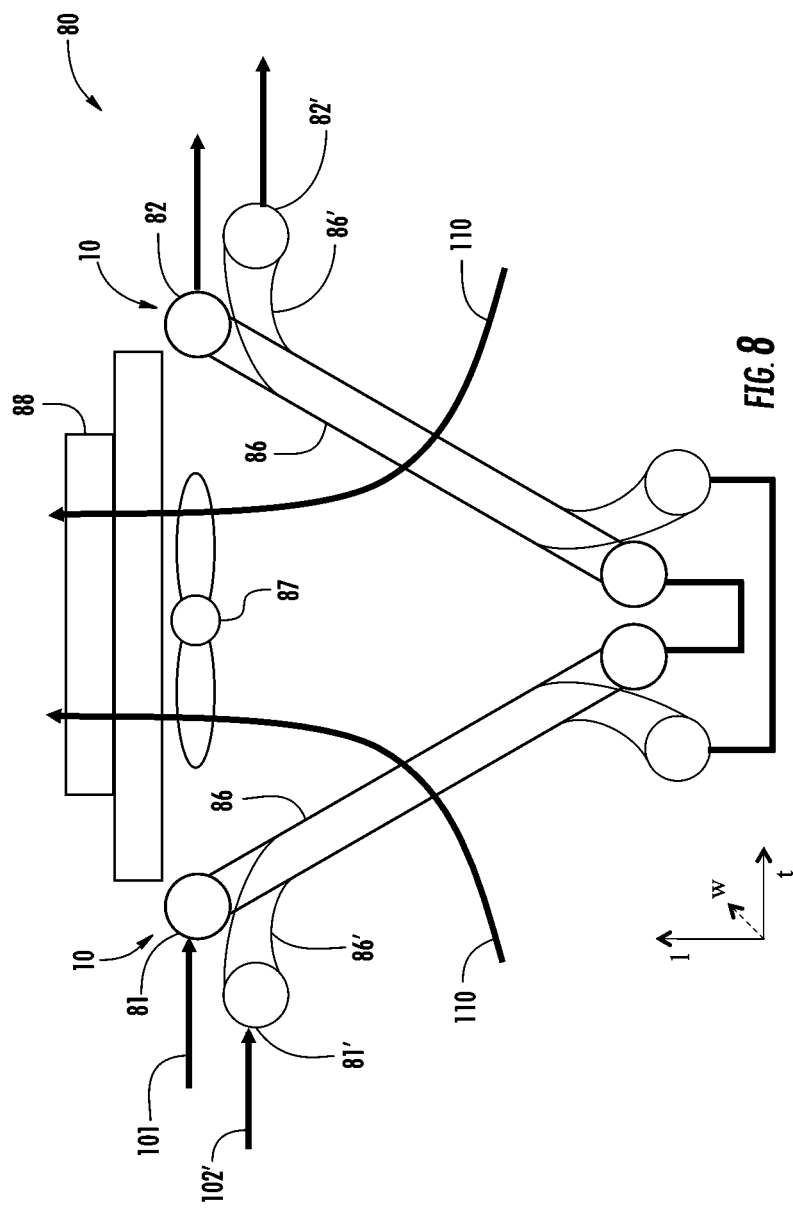
FIG. 8 is a schematic illustration of a condenser unit having two combined core microchannel heat exchanger.
Figure 9:
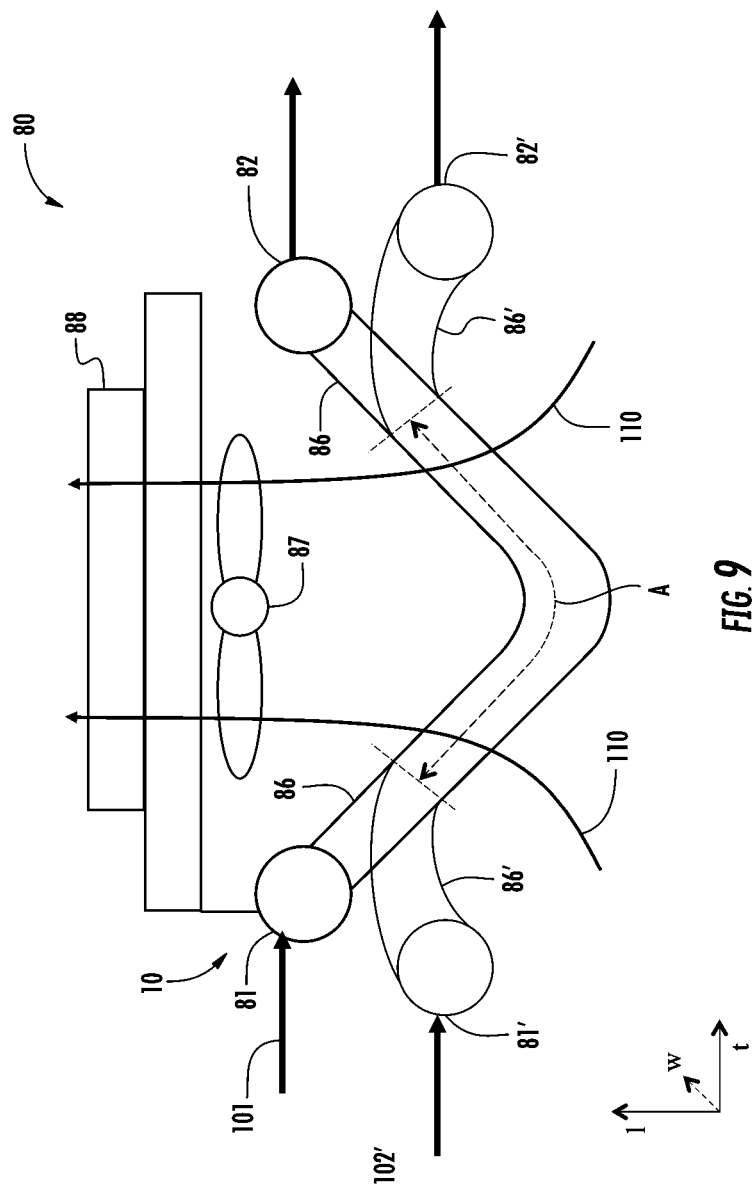
FIG. 9 is a schematic illustration of a condenser unit having a single combined core microchannel heat exchanger formed into a V shape.

FIGS. 8-9 are schematic illustrations of side views of condenser units 80 which can be used in the air conditioning system 100 including two separate fluid circuits. The first fluid circuit 101 can be part of a vapor compression cycle and can include conduits for directing the first heat transfer fluid from the first evaporator 6 to a first condenser inlet 81, through first condenser coil(s) 86 and out of the condenser unit 80 via a first condenser outlet 82. The first condenser coil(s) 86 are arranged in a V shape, but other arrangements are contemplated, including an A shape (e.g., upside down V shape), C shape, J shape, L shape, M shape, N shape, U shape, W shape, or Z shape and the like.

The second fluid circuit 102 can be part of a free cooling circuit 102' and can include conduits for directing the second heat transfer fluid from the heat source at the zone to be cooled 104 (e.g., terminal fan-coil) to a second condenser inlet 81', through second condenser coil(s) 86' and out of the condenser unit 80 via a second condenser outlet 82'. The second condenser coil(s) 86' are arranged in a V shape, but other arrangements are contemplated, including an A shape (e.g., upside down V shape), C shape, J shape, L shape, M shape, N shape, U shape, W shape, or Z shape and the like. The second condenser coil(s) 86' can have a shape corresponding to the shape of the first condenser coil(s) 86.

A fan 87 is arranged within the V shaped condenser coils and can draw a third heat transfer fluid (e.g., air) along a flow path 110 through the first condenser coils 86 and the second condenser coils 86' simultaneously and out the top flow guide 88. This arrangement is presented for illustrative purposes only. Other arrangements are contemplated by the inventor. For example, at least any of the inlet/outlet locations, heat exchanger shapes and orientations, internal heat exchanger circuiting of any heat exchanger (86, 86'), the order of heat exchanger coils along the flow path 110 direction (e.g., outside the overlapping portion A), the flow direction of the first heat transfer fluid, the flow direction of the second heat transfer fluid, the direction of the flow path 110 of the third heat transfer fluid, the order of heat exchanger coils along the first fluid circuit 101, the location of the pump second 3' in the free cooling circuit, the order of heat exchanger coils along the second fluid circuit 102, or the order of heat exchanger coils along the free cooling circuit 102', and the like can be altered without departing from the breadth of the present disclosure. The combined core microchannel heat exchanger 10 in FIG. 8 illustrates two separate combined core microchannel heat exchangers 10 arranged adjacent to one another in a V shape. FIG. 9 illustrates a single combined core microchannel heat exchanger 10 bent into a V shape.

FIG. 9 shows the fluid circuits (101, 102') schematically with the first fluid circuit 101 inboard of the free cooling circuit 102' (e.g., at least outside the interleaved section). However, other orientations of the two fluidly separate circuits are contemplated by the inventor. For example, the first fluid circuit 101 can be outboard of the free cooling circuit 102' (e.g., at least outside the interleaved section), the first fluid circuit 101 can be inboard of the free cooling circuit 102' along one or more sections of the circuit, the free cooling circuit 102' can be inboard of the first fluid circuit 101 along one or more sections of the circuit, or the like.

Figure 10:
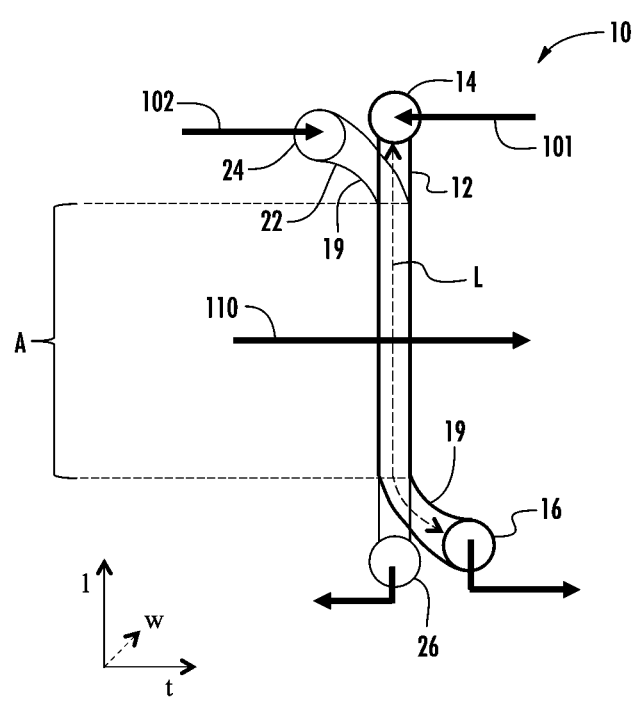
FIG. 10 is a schematic illustration of a side view of a combined core microchannel heat exchanger where each the first and second plurality of microchannel tubes interleaved having a single bend.

FIG. 10 is a schematic illustration of a combined core microchannel heat exchanger' 10 having a first plurality of microchannel tubes 12 extended between and fluidly connected to a first inlet header 14 and a first outlet header 16 disposed in a first fluid circuit 101 conveying a first heat transfer fluid (e.g., refrigerant as described previously). The combined core microchannel heat exchanger 10 has a second plurality of microchannel tubes 22 extended between and fluidly connected to a second inlet header 24 and a second outlet header 26 disposed in a free cooling circuit 102' conveying a second heat transfer fluid (e.g., water, or a brine, as described previously). Each of the first plurality of microchannel tubes 12 and the second plurality of microchannel tubes 22 can include a bend 19 such that their corresponding straight sections overlap along a portion A of the effective length L of the first plurality of microchannel tubes 12, or more specifically about 60% to about 95%, or about 65% to about 80% of the effective length of the first plurality of microchannel tubes 12. Where the effective length L of a tube of the first plurality of microchannel tubes 12 can be the average path distance the tube travels between the pair of first headers (14, 16) such as shown in FIG. 10, e.g., accounting for curvature along the path, but not including any insertion distance into the header. A third heat transfer fluid (e.g., air) can be passed across both the first plurality of microchannel tubes 12 and the second plurality of microchannel tubes 22 simultaneously along flow path 110.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combined core microchannel heat exchanger comprising:
    a first plurality of microchannel tubes extended between, and in fluid communication with, a first inlet header and a first outlet header arranged in a first fluid circuit,
    a second plurality of microchannel tubes extended between, and in fluid communication with, a second inlet header and a second outlet header arranged in a second fluid circuit, wherein the first fluid circuit is fluidly isolated from the second fluid circuit and a microchannel tube of the second plurality of microchannel tubes is interleaved between adjacent microchannel tubes of the first plurality of microchannel tubes, and
    a plurality of fins disposed between the microchannel tube of the second plurality of microchannel tubes and the first plurality of microchannel tubes.

2. The combined core microchannel heat exchanger of claim 1, wherein the first fluid circuit comprises a vapor compression cycle and the second fluid circuit comprises a free cooling circuit.

3. The combined core microchannel heat exchanger of claim 1, wherein the first fluid circuit comprises a first heat transfer fluid comprising a refrigerant.

4. The combined core microchannel heat exchanger of claim 1, wherein the second fluid circuit comprises a second heat transfer fluid comprising water, glycol, a corrosion inhibitor, a brine or a combination comprising at least one of the foregoing.

5. The combined core microchannel heat exchanger of claim 1, wherein the first plurality of microchannel tubes and the second plurality of microchannel tubes each comprise a bend for aligning a portion of the tubes.

6. The combined core microchannel heat exchanger of claim 1, wherein the second plurality of microchannel tubes comprises two bends for aligning a portion of the second plurality of heat transfer tubes with the first plurality of heat transfer tubes.

7. The combined core microchannel heat exchanger of claim 1, wherein the first plurality of microchannel tubes comprises multiport tubes having two or more ports and the second plurality of microchannel tubes comprises one to five ports.

8. The combined core microchannel heat exchanger of claim 1, wherein the first plurality of microchannel tubes and the second plurality of microchannel tubes extend in an aligned, overlapping fashion for at least 60% of their effective tube length.

9. The combined core microchannel heat exchanger of claim 1, wherein each microchannel tube of the second plurality of microchannel tubes is interleaved into the first plurality of microchannel tubes such that the combined core microchannel heat exchanger has a thickness along a third fluid circuit flow direction equal to the thickness of a single tube.

10. The combined core microchannel heat exchanger of claim 1, wherein the first plurality of microchannel tubes comprises a ribbon bend forming a first pass section of the first plurality of microchannel tubes and a last pass section of the first plurality of microchannel tubes.

11. The combined core microchannel heat exchanger of claim 10, further comprising a third plurality of microchannel tubes extended between, and in fluid communication with, a third inlet header and a third outlet header arranged in a third fluid circuit, wherein the first fluid circuit and second fluid circuit are fluidly isolated from the third fluid circuit and a microchannel tube of the third plurality of microchannel tubes is interleaved between adjacent microchannel tubes of the first plurality of microchannel tubes in the last pass section of the first plurality of microchannel tubes.

12. The combined core microchannel heat exchanger of claim 10, further comprising a third plurality of microchannel tubes extended between, and in fluid communication with, a third inlet header and a third outlet header arranged in the second fluid circuit, wherein a microchannel tube of the third plurality of microchannel tubes is interleaved between adjacent microchannel tubes of the first plurality of microchannel tubes in the last pass section of the first plurality of microchannel tubes.

13. The combined core microchannel heat exchanger of claim 12, wherein the second plurality of microchannel tubes and the third plurality of microchannel tubes are arranged in a parallel flow configuration such that a flow of the second heat transfer fluid is split to flow through both the second plurality of microchannel tubes and the third plurality of microchannel tubes simultaneously before the flow merges.

14. The combined core microchannel heat exchanger of claim 11, wherein the third fluid circuit comprises a free cooling cycle.

15. The combined core microchannel heat exchanger of claim 11, wherein the third fluid circuit comprises a third heat transfer fluid comprising water, glycol, a corrosion inhibitor, a brine or a combination comprising at least one of the foregoing.

16. The combined core microchannel heat exchanger of claim 12, wherein the third fluid circuit comprises a free cooling cycle.

17. The combined core microchannel heat exchanger of claim 12, wherein the third fluid circuit comprises a third heat transfer fluid comprising water, glycol, a corrosion inhibitor, a brine or a combination comprising at least one of the foregoing.

18. An air conditioning system comprising
a heat sink,
a heat source,
a first fluid circuit comprising an evaporator and a condenser of a vapor compression cycle,
a second fluid circuit for transferring thermal energy from the heat source to the evaporator,
a free cooling circuit for transferring thermal energy from the heat source to the condenser, wherein the condenser comprises a first plurality of microchannel tubes extended between, and in fluid communication with, a first inlet header and a first outlet header arranged in the first fluid circuit,
a second plurality of microchannel tubes extended between, and in fluid communication with, a second inlet header and a second outlet header arranged in the free cooling circuit, wherein the first fluid circuit is fluidly isolated from the free cooling circuit and a microchannel tube of the second plurality of microchannel tubes is interleaved between adjacent microchannel tubes of the first plurality of microchannel tubes, and
a plurality of fins disposed between the microchannel tube of the second plurality of microchannel tubes and the first plurality of microchannel tubes.

19. The air conditioning system of claim 18, wherein the heat source is a data center and the heat sink is the outdoor environment.

20. A combined core microchannel heat exchanger comprising:
a first plurality of microchannel tubes extended between, and in fluid communication with, a first inlet header and a first outlet header arranged in a vapor compression circuit,
a second plurality of microchannel tubes extended between, and in fluid communication with, a second inlet header and a second outlet header arranged in a free cooling circuit, wherein the vapor compression circuit is fluidly isolated from the free cooling circuit and the second plurality of microchannel tubes are interleaved between adjacent microchannel tubes of the first plurality of microchannel tubes, and
a plurality of fins disposed between the second plurality of microchannel tubes and the first plurality of microchannel tubes at least along a portion of an effective length of the first plurality of microchannel tubes.

* * * * *